(12) United States Patent
Narita et al.

(10) Patent No.: US 6,710,331 B2
(45) Date of Patent: Mar. 23, 2004

(54) NEAR-FIELD MICROSCOPE (75) Inventors: Yoshihito Narita, Tokyo (JP); Shigeyuki Kimura, Tokyo (JP)

(73) Assignee: Jasco Corporation, Tokyo (JP)

( * ) Notice: Subject to any disclaimer, the term of this patent is extended or adjusted under 35 U.S.C. 154(b) by 106 days.

(21) Appl. No.: 09/986,012

(22) Filed: Nov. 7, 2001

(65) Prior Publication Data

US 2002/0056807 A1 May 16, 2002

(30) Foreign Application Priority Data

Nov. 13, 2000 (JP) ........................................ 2000-345372

(51) Int. Cl.[7] .............................. H01J 3/14; H01J 40/14; G01N 23/00; G01B 5/28
(52) U.S. Cl. ...................... 250/234; 250/216; 250/306; 73/105
(58) Field of Search ................................ 250/234, 216, 250/306–311; 73/105

(56) References Cited

U.S. PATENT DOCUMENTS

| | | | |
|---|---|---|---|
| 5,473,157 A | | 12/1995 | Grober et al. |
| 5,827,660 A | | 10/1998 | Singer et al. |
| 5,883,712 A | | 3/1999 | Coffin |
| 6,046,448 A | * | 4/2000 | Sato et al. |
| 6,064,060 A | * | 5/2000 | Konada |
| 6,144,028 A | * | 11/2000 | Kley |
| 6,212,292 B1 | * | 4/2001 | Soares |
| 6,274,871 B1 | * | 8/2001 | Dukor et al. |

FOREIGN PATENT DOCUMENTS

| | | |
|---|---|---|
| EP | 0 503 236 A2 | 9/1992 |
| EP | 0 622 652 A1 | 11/1994 |
| EP | 0 795 770 A1 | 9/1997 |
| EP | 0 864 899 A2 | 9/1998 |

OTHER PUBLICATIONS

Yasushi Inouye, et al., "Near–Field scanning optical microscope with a metallic probe tip," Optics Letters, Feb. 1, 1994, pp. 159–161, vol. 19, No. 3, Optical Society of America, Washington DC (XP000424356).

R. Bachelot, et al., "Near–field optical microscope based on local perturbation of a diffraction spot," Optics Letters, Sep. 15, 1995, pp. 1924–1926, vol. 20, No. 18, Optical Society of America, Washington DC (Xp000528383).

T. Fujimura, et al., "Observation of local light propagation in ordered Latex layers by scanning near–field optical micoscope," Materials Science and Engineering B, Aug. 1, 1997, pp. 94–102, vol. 48, No. 1–2, Elsevier Sequoia, Lausanne, CH (XP004115949).

* cited by examiner

Primary Examiner—David Porta
Assistant Examiner—David C Meyer
(74) Attorney, Agent, or Firm—Ronald R. Snider; Snider & Associates (57) ABSTRACT

A near-field microscope comprising: a probe for scattering a near-field light; light emitting device including a light source for emitting light to a sample or said probe; and light sampling device for sampling and detecting a light that includes information of the sample scattered by said probe, said microscope comprising: control device for spacing said sample or probe from a field of a near-field light generated by said light emission or disposing the sample or probe at a position that is shallow in a field of near-field light, thereby detecting a noise by said light sampling device; inserting said sample or probe deeply into a field of near-field light generated by said light emission, thereby detecting light intensity by said light sampling device; and computing device for computing a measurement result obtained by subtracting a noise from said light intensity.

24 Claims, 7 Drawing Sheets

NEAR-FIELD MICROSCOPE

RELATED APPLICATIONS

This application claims the priority of Japanese Patent Application No. 2000-345372 filed on Nov. 13, 2000, which is incorporated herein by reference.

FIELD OF THE INVENTION

The present invention relates to a near-field microscope.

More particularly, the present invention relates to an improvement of a near-field microscope having a mechanism for eliminating an effect of noise from a measurement result.

BACKGROUND OF THE INVENTION

A general optical microscope can not observe an object which is smaller than a light wavelength, and its resolution is limited. On the other hand, although an electronic microscope or the like can improve resolution remarkably, operation in air or solution is very difficult. Thus, a high resolution microscope such as electronic microscope has not always been satisfactory in the field handling physiological specimens in particular.

In contrast, in recent years, there has been developed a near-field microscope based on a principle which is different from that of a general optical microscope or electronic microscope, and its application is expected. This near-field microscope detects a so called near-field light. That is, the near-field microscope observes a measurement sample based on the following principle.

When light is emitted to a measurement sample, a surface wave called a near-field light is generated in the vicinity of a measurement surface. This surface wave is localized with a distance in a region within a light wavelength on a object surface.

A probe with its sharp tip is inserted into a field of near-field light, near-field light is scattered, and its scattered light intensity is measured, whereby a spectrum in a minutely small region within a light wavelength can be obtained. Alternatively, when a probe is oscillated at its resonance frequency, and the probe and the surface of a measurement object are approached, a distance between the surface of the measurement object and probe can be controlled by using the fact that its amplitude decreases.

Therefore, a probe is scanned while the amplitude of the probe is constant, whereby the tip end position of the probe properly reflects irregularities of the measurement object. Moreover, the probe tip end merely exists in a field of near-field light, and does not come into contact with the measurement object. Thus, an object which is smaller than a value of light wavelength can be observed in a non-contact and non-destructive manner relevant to a sample.

However, minutely small irregularities are provided on the surface of a measurement object. Due to an effect of the irregularities, even in a near-field microscope, the measurement result includes a noise that mainly has a background consisting of reflection light or the like from a sample.

In addition, a near-field technique capable of achieving spatial resolution exceeding a wavelength limit has been mainly used to observe a more precise measurement sample image within a range that is smaller than light wavelength. Thus, visible light laser has been mainly used.

In addition, although there has existed a microscope using an infrared light with its monochromatic wavelength because its object is to sample an image when a measurement object is observed in spatial resolution exceeding a wavelength limit, an apparatus capable of spectrum measurement due to an infrared light has not existed. However, because of its long wavelength, an infrared light is very useful if application exceeding a wavelength limit by a near-field is possible.

In addition, if a near-field spectrum can be sampled by using an infrared light, spectrum measurement within a range smaller than light wavelength is possible, and a measurement sample can be analyzed in more detail.

SUMMARY OF THE INVENTION

The present invention has been made in order to solve the foregoing problem. It is an object of the present invention to provide a near-field microscope capable of eliminating an effect of noise from a measurement result and to provide an infrared near-field microscope using an infrared light source as a light source, thereby enabling near-field infrared spectrum measurement within a range that is smaller than light wavelength using a near-field technique.

In order to achieve the foregoing object, according to one aspect of the present invention, there is provided a near-field microscope comprising: a probe for scattering a near-field light; light emitting means including a light source for emitting light to a sample or the probe; and light sampling means for sampling and detecting a light that includes information of the sample scattered by said probe, said microscope comprising: control means for spacing the sample or probe from a field of a near-field light generated by the light emission or disposing the sample or probe at a position that is shallow in a field of near-field light, thereby detecting a noise by the light sampling means; inserting the sample or probe deeply into a field of near-field light generated by the light emission, thereby detecting light intensity by the light sampling means; and computing means for computing a measurement result obtained by subtracting a noise from the light intensity.

Preferably, in a near-field microscope of the invention, there are provided: spectroscopic means for spectrographically dispersing light emitted to a sample or probe by the light emitting means or light containing information on a sample scattered by said probe into light within a specific wavelength range; and analysis means for storing and analyzing measurement data for each wavelength sampled by the light sampling means, whereby a near-field spectrum on a sample can be sampled.

Preferably, in a near-field microscope of the invention, an interferometer is used for the spectroscopic means, the interferometer includes a movement mirror that carries out reciprocal movement, the control means controls so that the sample or probe is deeply inserted into a field of a near-field light in a forward passage of said movement mirror, light intensity is detected by the light sampling means, said sample or probe is spaced from a field of a near-field light in a backward passage of the movement mirror and is disposed at a position that is shallow in a field of near-field light, and a noise is detected by said light sampling means.

Preferably, in a near-field microscope of the invention, light emitted by light emitting means is infrared light.

Preferably, in a near-field microscope of the invention, a light source contained in light emitting means is a high temperature heating element.

Preferably, in a near-field microscope of the invention, a light source for emitting light to a sample or probe is a wavelength variable laser.

Preferably, in a near-field microscope of the invention, the spectroscopic means is composed of any of a wavelength variable filter, a band pass filter having an arbitrary wavelength width, a Fourier transform type spectroscopic device or a dispersion type spectroscopic device.

Preferably, in a near-field microscope of the invention, the light emitting means carries out illumination by means of reflecting illumination that emits light directly to a sample or the probe, thereby generating a near-field light and/or by means of total reflecting illumination that brings a prism of a medium with its high refraction index into contact with a sample and reflects the light totally at a boundary of the sample and prism, thereby generating a near-field light on a sample surface.

Preferably, in a near-field microscope of the invention, the light emitting means can be selected by switching it to illumination of either one of the reflecting illumination and the total reflecting illumination.

Preferably, in a near-field microscope of the invention, the light emitting means is composed of at least a light source and a Cassegrainian mirror.

Preferably, in a near-field microscope of the invention, the shape of a medium with its high refraction index of the total reflecting prism for use in total reflecting illumination is a hemispheric or analogous shape, and a focus of the Cassegrainian mirror is formed at the center of said prism plane section.

Preferably, in a near-field microscope of the invention, a medium with its high refraction index of the total reflecting prism for use in total reflecting illumination is composed of any material of ZnSe, KSR-5, Ge, Si, and diamond.

Preferably, in a near-field microscope of the invention, the light sampling means is composed of: a Cassegrainian mirror for collecting light that contains sample information; and a detector for detecting the light collected by said Cassegrainian mirror.

Preferably, in a near-field microscope of the invention, the near-field microscope comprising modulating means for modulating light emitted to a sample or probe intermittently between a light source and the sample or probe.

Preferably, in a near-field microscope of the invention, a switching reflection mirror or dichroic mirror is arranged between the Cassegrainian mirror and the detector, and is arranged so as to enable the sample and probe to be visually observed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principle of the present invention.

DETAILED DESCRIPTION OF THE PREFERRED EMBODIMENT

Reference will now be made in detail to the presently preferred embodiments of the invention as illustrated in the accompanying drawings, in which like reference numerals designate like or corresponding parts.

Hereinafter, preferred embodiments of the present invention will be described with reference to the accompanying drawings.

Figure 1:
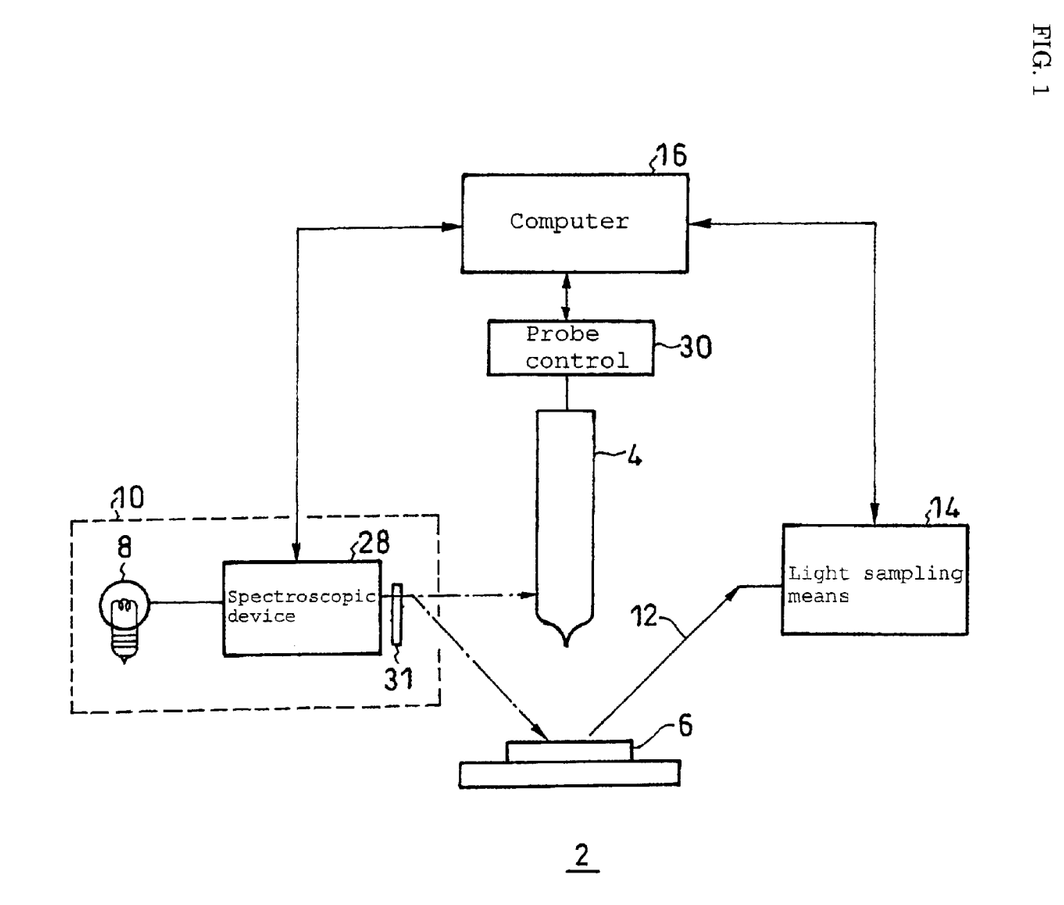
FIG. 1 is a view illustrating a brief configuration according to one embodiment of the present invention.

FIG. 1 is a view showing a brief configuration of one embodiment of the present invention. As shown in the figure, a near-field microscope 2 in the present invention has: a probe 4 for scattering a near-field light; light emitting means 10 that includes a light source 8 for emitting a light to a sample 6 or the probe 4; light sampling means 14 for sampling and detecting a light 12 that contains information on the sample scattered by the probe 4; and computing means 16.

In the near-field microscope 2 shown in FIG. 1, a control means (not shown) controls so that the sample 6 or probe 4 is spaced from a field of near-field light generated by light emission or is disposed at a position that is shallow in a field of near-field light. In this manner; a noise is detected by the light sampling means 14. And the control means controls so that the sample 6 or probe 4 are deeply inserted into a field of near-field light generated by the light emission. In this manner, a light intensity is detected by the light sampling means 14. Therefore, a measurement result obtained by subtracting the noise from the light intensity is computed by computer (computing means) 16.

Figure 2A:
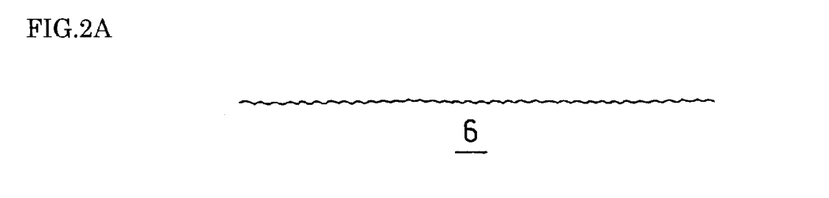
FIGS. 2a–c are views illustrating an operation when a field of near-field light is generated with a sample surface.
Figure 2B:
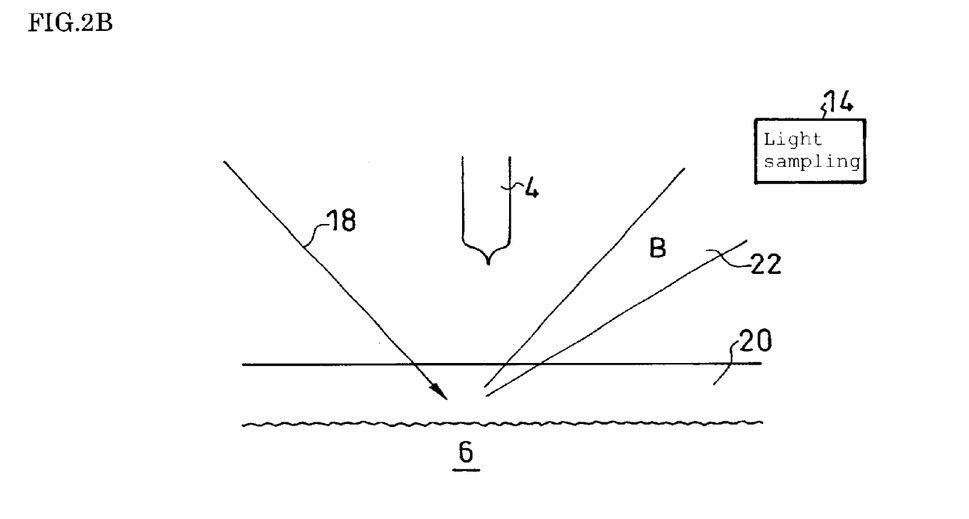
Figure 2C:
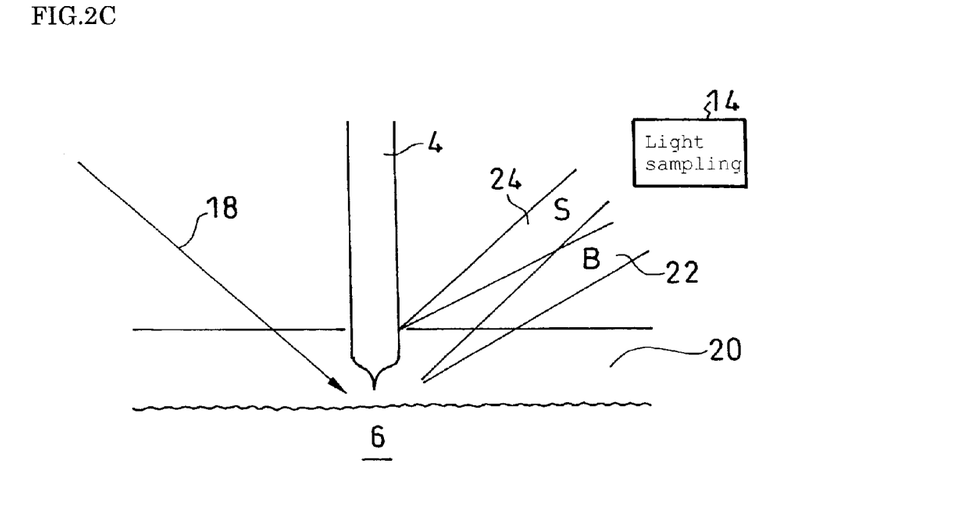

A detailed view of operation is illustrated in FIG. 2. In the figure, a description will be given by way of example when light is emitted to a sample surface, thereby generating near-field light, and a probe is inserted into a field of the near-field light, thereby carrying out measurement.

As shown in FIG. 2A, the surface of the sample 6 has very minutely small irregularities. As shown in FIG. 2B, when a light 18 is emitted to the surface of the sample 6 by light emitting means, a field 20 of near-field light is formed on the surface of the sample 6. However, a noise 22 is slightly detected as a background in the light sampling means 14, although the probe 4 is not inserted into the field 20 of near-field light.

Therefore, the probe 4 is spaced from the field 20 of near-field light generated by light emission or is disposed at a position that is shallow in a field of near-field light by the control means, whereby the noise 22 is detected by light sampling means 14.

As shown in FIG. 2C, the control means controls so that the probe 4 is deeply inserted into the field 20 of near-field light generated by light emission, and light intensity is detected by light sampling means 14. This light intensity includes the noise 22 together with a signal light 24 that contains sample information. Therefore, the scale of a noise detected in a state shown in FIG. 2B is subtracted from light intensity detected in a state shown in FIG. 2C by the computing means 16, whereby a precise measurement result is obtained.

Figure 3A:
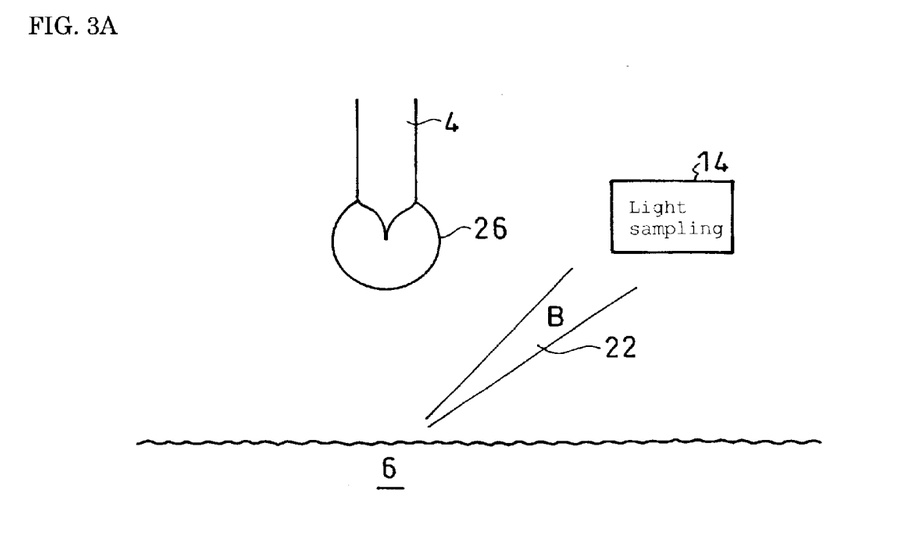
FIGS. 3a–b are views illustrating an operation when a field of near-field light is generated with a probe.
Figure 3B:
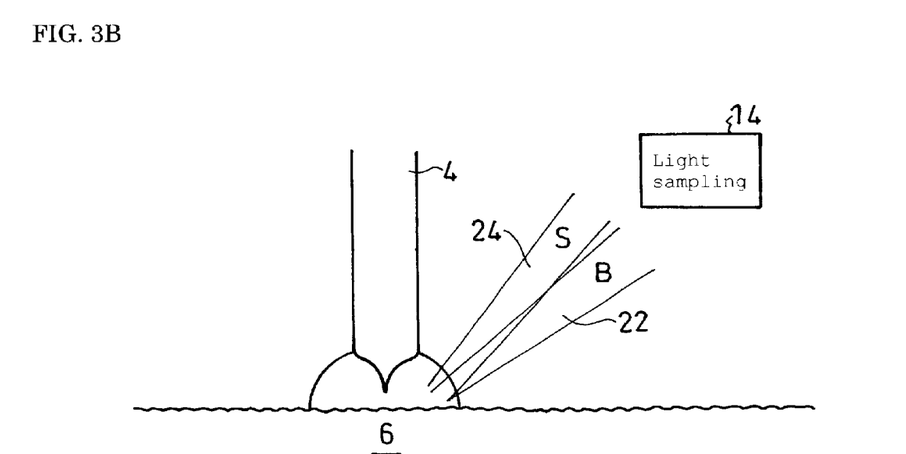

In the near-field microscope, a near-field light is not only thus generated on the surface of the sample 6 as shown in FIG. 2, but also the light may be generated with a probe as shown in FIG. 3.

FIG. 3 is an illustrative view of an operation when a field of near-field light is generated with a probe.

As shown in the figure, in the case where a field of near-field light is generated with a probe by light emission, as shown in FIG. 3A, the sample 6 is spaced from the field 26 of near-field light or is disposed at a position that is shallow in a field of near-field light by the control means. In this manner, a noise 22 is detected by light sampling means 14. And as shown in FIG. 3B, the control means controls so that the sample 6 is then deeply inserted into a field of near-field generated by the light emission. In this manner, light intensity is detected by the light sampling means 14. Therefore, the measurement result of a signal light 24 obtained by subtracting the noise from the light intensity is computed by the computing means 16.

Preferably, such a near-field microscope according to the present invention has spectroscopic means for spectrographically dispersing light emitted to a sample or a probe by the light emitting means or light containing information on a sample scattered by the probe into light whose wavelength is within a specific range; and analysis means for storing and analyzing measurement data for each wavelength sampled by the light sampling means, whereby a near-field spectrum of a sample can be sampled.

In one embodiment of the present invention shown in FIG. 1, light emitting means 10 is composed of a light source 8 and a spectroscopic device 28 so that light whose wavelength is within a specific range is emitted to a sample or a probe by letting the light from the light source 8 through the spectroscopic device 28. In addition, analysis means stores light intensity detected by light sampling means together with a wavelength emitted to the sample or probe, whereby the measurement result of a near-field spectrum of a sample can be obtained.

In the present embodiment, computing means 16 is composed of a computer, and this computer is compatible with analysis means as well. The measurement result is stored so as to be recorded in a state that can be analyzed in a hard disk of the computer. In addition, this computer is communicable in a bidirectional manner with a detector being a spectroscopic device 28 and light sampling means 14 and probe control means 30 for controlling probe oscillation and operation. Further, the computer is capable of controlling and managing the spectroscope device, detector, and probe control means.

With such a configuration, it is possible to obtain a near-field spectrum of a sample. In addition, control and management of measuring conditions for testing and each operating section can be strictly carried out, thus making it possible to enhance precision of the measurement result.

In the present invention, although a computer is used as computing means, such an electric calculator may be used as computing means or a noise free signal may be delivered to a computer with a circuit construction. There is no particular limitation to a construction of computing means.

In addition, although FIG. 1 shows an exemplary configuration of emitting spectrographically dispersed light to a sample or a probe, the present invention is not limited to this example. Even in a construction in which continuous light free of being spectrographically dispersed is emitted to a sample or a probe, thereby spectrographically dispersing and detecting light that contains sample information, the similar advantageous effect can be obtained.

In addition, in such a construction having spectroscopic means, in the case where an interferometer is used for the spectroscopic means, it is preferable that, by the control means, in a forward passage of a movement mirror of the interferometer, the sample or probe is deeply inserted into a field of near-field light, and the light intensity is detected by the light sampling means; and by the control means, in a backward passage of the movement mirror, the sample or probe is spaced from a field of near-field light or is disposed at a position that is shallow in the field of near-field light, whereby the noise is detected by the light sampling means.

In this way, in the case where the interferometer is used for the spectroscopic means, a probe operation is synchronized with an operation of the movement mirror of an interferometer by the control means. This makes it possible to reduce a required time for measurement to about ½ as compared with a method for simply detecting a noise and a light that contains sample information, and then, obtaining a difference between the noise and light.

In the present invention, it is preferable that light emitted by light emitting means is an infrared light. The infrared light has a long wavelength among light waves. Thus, a near-field microscope capable of carrying out observation exceeding a wavelength limit is used, whereby a resolution can be improved using the infrared light.

In the case where such an infrared light is used, it is preferable that a light source contained in light emitting means is a high temperature heating element. Using such a light source can simplify an equipment configuration, and makes it possible to ensure cost reduction. In addition, a light source for emitting light to a sample or a probe may be a wavelength variable laser. The improvement of measurement precision can be expected by using such a wavelength variable laser.

In the present invention, as the spectroscopic means, there can be used a wavelength variable filter or a band pass filter and the like having an arbitrary wavelength width. If the spectroscopic means is formed by such a filter, equipment configuration can be simplified, making it possible to ensure cost reduction.

A Fourier transform type spectroscopic device or dispersion type spectroscopic device may be used as a light source. Using such a spectroscopic device makes it possible to improve measurement precision more remarkably.

In the present invention, when spectroscopic means other than the Fourier transform type spectroscopic device is used, it is preferable that light emitted to a sample or a probe is intermittently modulated between a light source and the sample or probe by a modulating means 31. With such a configuration, the modulated light is emitted to the sample or probe, and a near-field light is modulated as well. Therefore, light containing sample information can be easily detected.

The following illumination methods for generating a field of near-field light in the near-field microscope according to the present invention are used. FIG. 4 is an illustrative view showing an illumination method for generating a field of near-field light that can be used in the present invention.

Figure 4A:
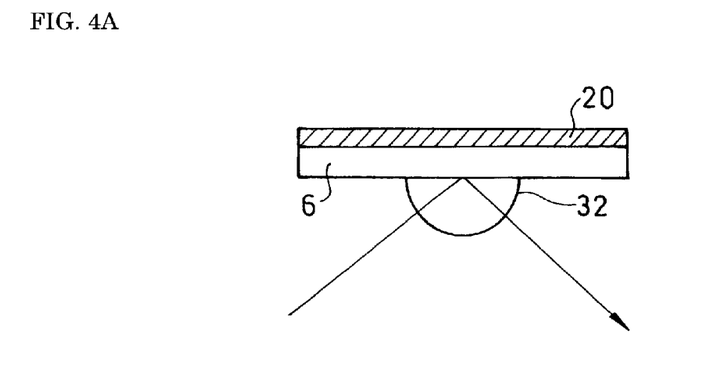
FIGS. 4a–d are views illustrating an illumination method for generating a field of near-field light that can be used in the present invention.

In a method shown in FIG. 4A, a total reflecting prism 32 is brought into intimate contact with a sample 6, and light is emitted to the intimate contact portion. Then, light is totally reflected at the boundary between the prism 32 and sample 6, and a field 20 of near-field light is generated on the surface of the sample 6. In the specification, this illumination method is referred to as total reflecting illumination.

Figure 4B:
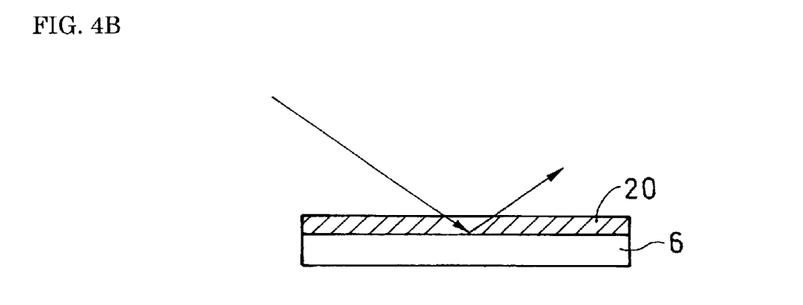

In a method shown in FIG. 4B, light is directly emitted to a sample 6, and a field 20 of near-field light is generated on the surface of the sample 6. In the specification, this illumination method is referred to as reflecting illumination.

Figure 4C:
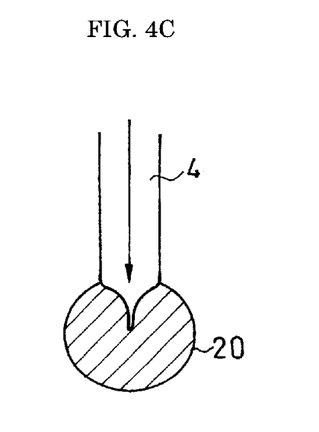
Figure 4D:
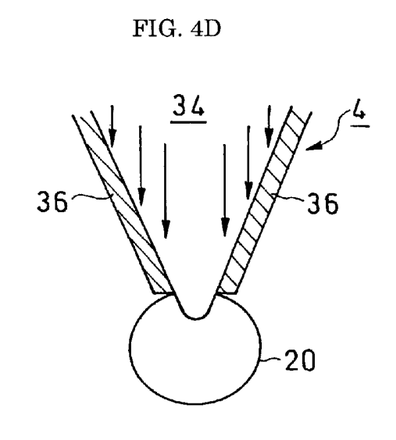

In a method shown in FIG. 4C, a field 20 of near-field light is generated at the tip end of a probe 4. In this method, as shown in FIG. 4D, the probe is composed of a light conducting material 34, and its surface is covered with a metal 36. With such a configuration, the light advanced in the light conducting material 34 is emitted to the metal 36 covering the surface, and the field 20 of near-field light is formed on the surface of the metal 36. A very minutely small opening that is not covered with the metal 36 at the tip end of the probe is formed, the field of near-field light leaks to the outside from the opening, and the field 20 of near-field light is formed at the tip end of the probe.

In the near-field microscope according to the present invention, it is preferable that the light emitting means is selectable by switching it to either one of the reflecting illumination and the total reflecting illumination.

Figure 5A:
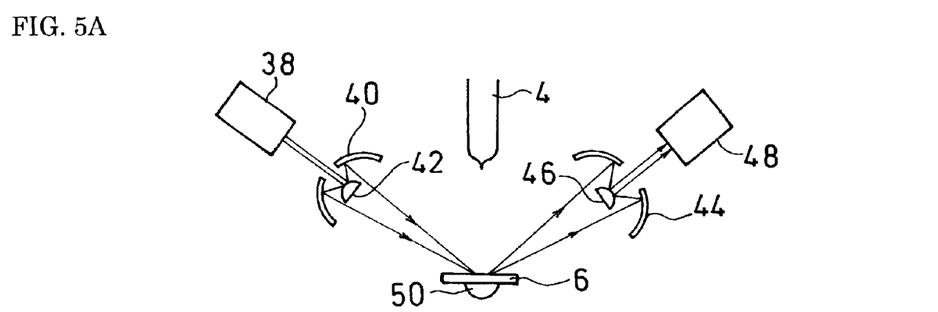
FIGS. 5a–c are views showing an exemplary configuration of an illumination switching mechanism according to one embodiment of the present invention.
Figure 5B:
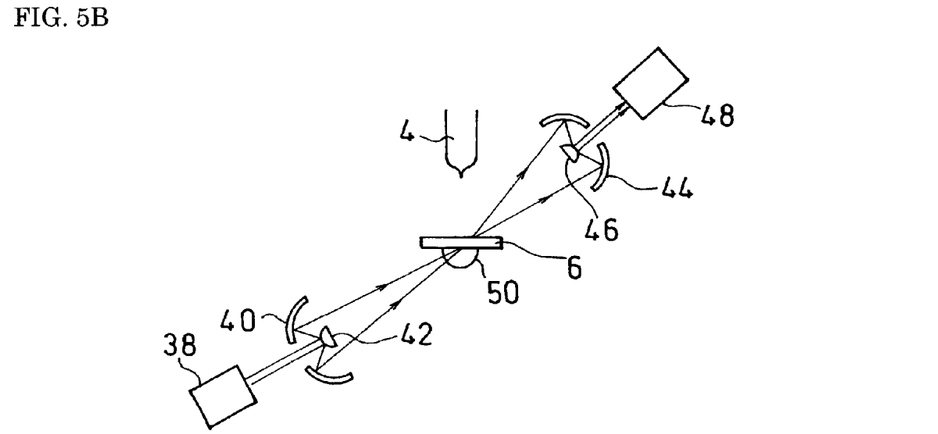
Figure 5C:
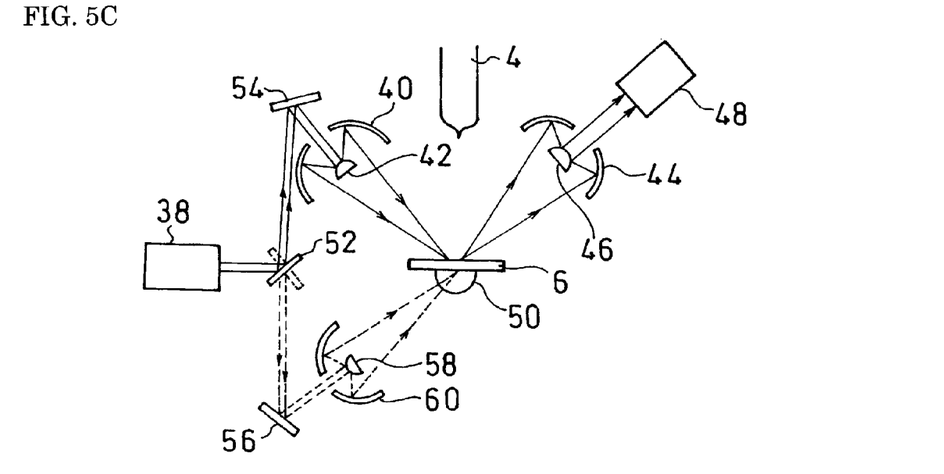

FIG. 5 shows an exemplary configuration of an illumination switching mechanism according to one embodiment of the present invention.

As shown in FIG. 5A, in the illumination mechanism according to the present invention, light emitting means consists of: a light emitting device 38 containing a light source; and a Cassegrainian mirror that consists of a concave face mirror 40 and a convex face mirror 42, and is configured so as to directly emit light onto a sample. In addition, light sampling means consists of: a Cassegrainian mirror that consists of a concave face mirror 44 and a convex face mirror 46; and a detector 48. The near-field light is generated on the surface of a measurement sample by light emission caused by light emitting means; the near-field light is scattered by the probe 4; and the near-field light is measured by light sampling means whose focus is adjusted at a probe insert position for near-field light on the sample.

In such a device carrying out reflecting illumination, when the current illumination is switched to total reflecting illumination, the device is configured so that the disposition/position of light emitting means can be changed. As required, as shown in FIG. 5B, the disposition/position of light emitting means is changed, and the light emitting means itself is relocated so that a focus of the Cassegrainian mirror that consists of the concave face mirror 40 and convex face mirror 42 is formed at the center of a total reflecting prism 50 provided at a stage so as to come into intimate contact with the sample.

In the other exemplary configuration, as shown in FIG. 5C, there are fixed a light emitting device 38; a Cassegrainian mirror and a reflection mirror 54, the Cassegrainian mirror consisting of the concave face mirror 40 and the convex face mirror 42; and a Cassegrainian mirror and a reflection mirror 56, the Cassegrainian mirror consisting of a concave face mirror 60 and a convex face mirror 58, and reflecting illumination or total reflecting illumination can be switched by a rotary mirror 52.

This makes it possible to select an illumination method that is advantageous in measurement depending on sample properties. The illumination method according to the present invention is not limited to those achieved by equipment configuration shown here.

In the near-field microscope according to the present invention, it is preferable that the shape of a high reflection index medium of the total reflecting prism for used in total reflecting illumination is a semispherical or analogous shape, and a focus of a Cassegrainian mirror is formed at the center of the prism flat face section.

By using the thus shaped total reflecting prism, a prism incidence enable direction becomes very wide, and a sample intimate contact area at a flat face section increases, preferably enabling total reflection.

In addition, the focus of the Cassegrainian mirror is formed at the center of a prism flat face section, whereby a near-field light can be preferably generated by total reflecting illumination, and a stable near-field light can be generated.

In the near-field microscope according to the present invention, if an infrared light source is used for a light source, it is preferable that a high reflection index medium of the total reflecting prism for use in total reflecting illumination is composed of a material such as any of ZnSe, KRS-5, Ge, Si, and diamond.

The total reflecting prism composed of these materials can preferably function as a total reflecting prism even if a light source is an infrared light.

In addition, in the light sampling means according to the present invention, as shown in FIG. 5, it is preferable that the sampling means is composed of a Cassegrainian mirror for collecting light that containing sample information and a detector for detecting the light collected by the Cassegrainian mirror.

With such a configuration, light containing information on a sample scattered by a probe can be collected and detected within a wide range.

Further, light emitting means and light sampling means are composed of a Cassegrainian mirror, whereby there can be achieved advantageous effect that color dispersion can be eliminated, a large number of NA (numerical aperture) can be obtained, and a long work distance can be obtained.

As shown in FIG. 5, in carrying out illumination caused by reflecting illumination, it is preferable that light sampling means is located at a position of a dark field of view from light emitting means to prevent the reflection light of an illumination from directly entering a detector.

In addition, the light sampling means in the near-field microscope according to the present invention is not limited to only a configuration shown in FIG. 5, and a variety of configurations can be employed.

Figure 6A:
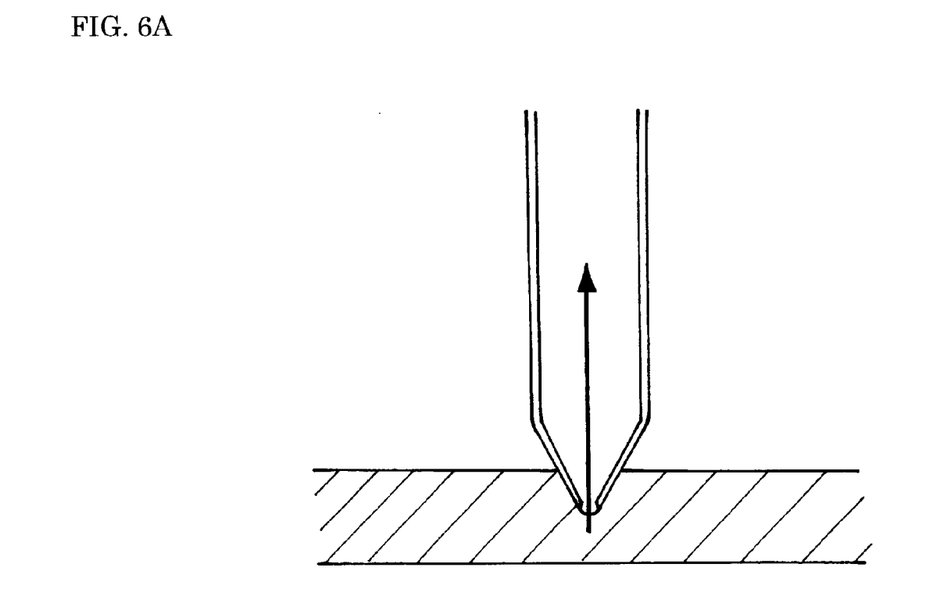
FIGS. 6a–b are views showing an exemplary configuration when light sampling means according to the present invention can be obtained.
Figure 6B:
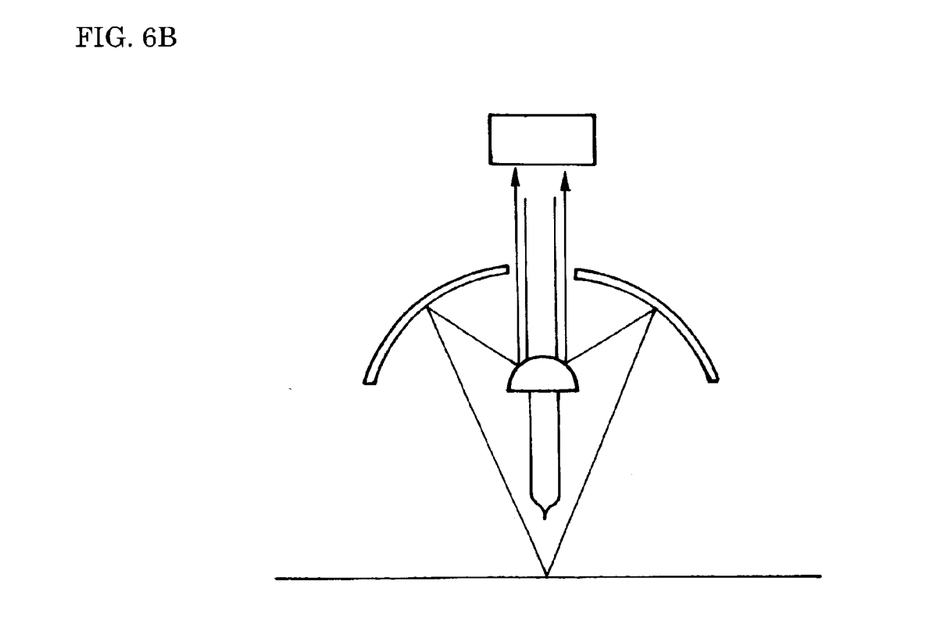

FIG. 6 shows an exemplary possible configuration of the light sampling means according to the present invention.

As shown in FIG. 6A, a probe is composed of a light conducting material, making it possible to sample light that contains sample information from the tip end of the probe.

In addition, as shown in FIG. 6B, holes are provided at the centers of the convex face mirror and concave face mirror of a Cassegrainian mirror, and a probe is passed through these holes, thereby making it possible to arrange the light sampling means upwardly of the sample.

With a configuration as shown in FIG. 6, equipment can be simplified and reduced in size. An exemplary configuration of the light sampling means according to the present invention is not limited to that shown here. Although the exemplary configuration of the light sampling means is shown here, a similar configuration can be used for light emission.

The near-field microscope according to the present invention described above will be described in more detail by way of embodiments.

Near-Field Infrared Microscope

Figure 7:
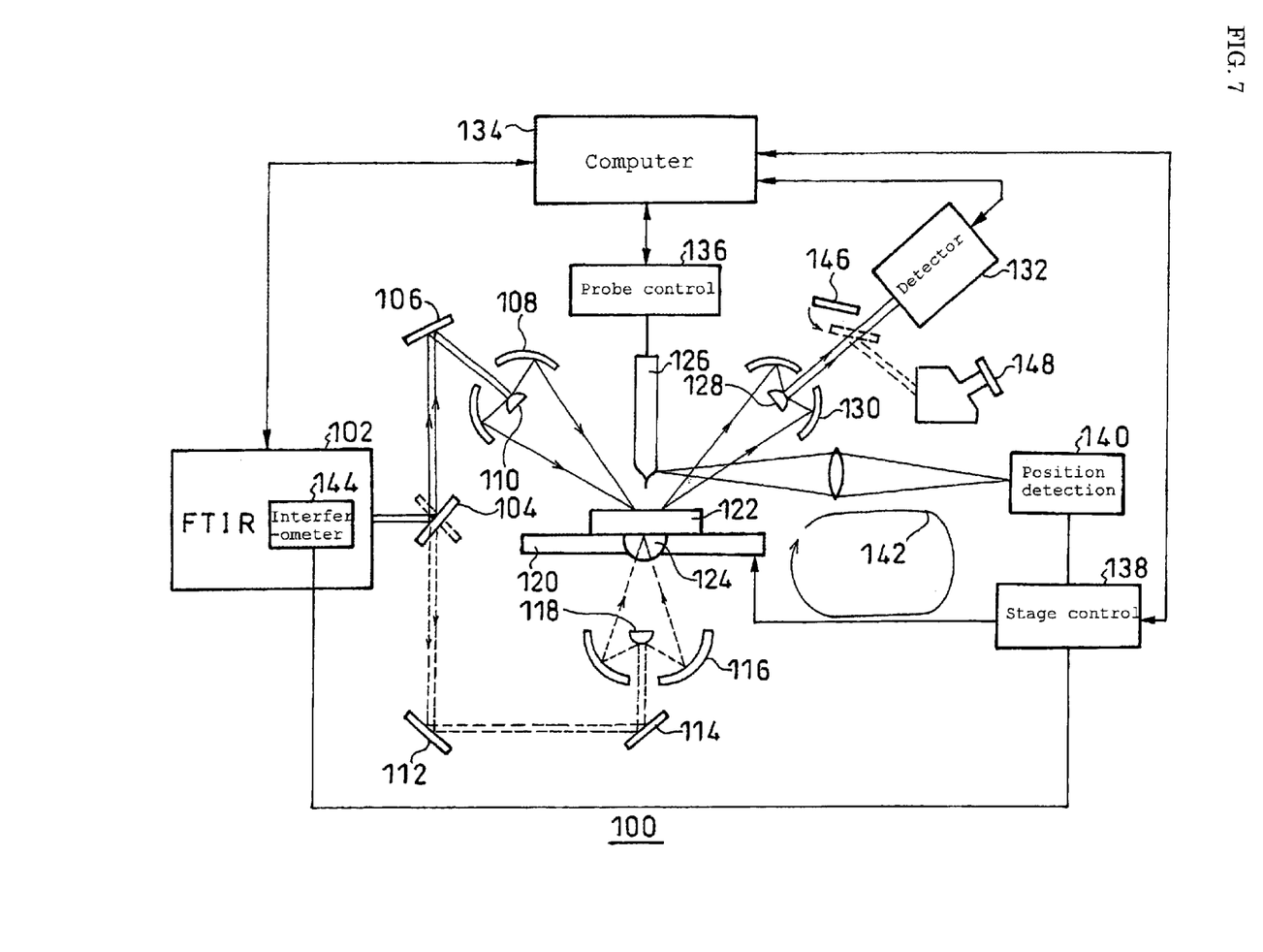
FIG. 7 is a view showing a brief configuration of a near-field infrared light microscope according to the embodiment of the present invention.

FIG. 7 is a view showing a brief configuration of a near-field infrared microscope according to one embodiment of the present invention.

A near-field infrared microscope 100 shown in the figure comprises: a Fourier transform type infrared spectrophotometer 102 (FTIR) containing a light source being spectroscopic means as light emitting means; a rotary reflection mirror 104; a reflection mirror 106; and a Cassegrainian mirror consisting of a concave face mirror 108 and a convex mirror 110, wherein reflecting illumination can be carried out for a sample. In addition, light emitting means rotates the rotary reflection mirror 104, thereby making it possible to switch the current illumination to total reflecting illumination for emitting light to the center of a semispherical total reflecting prism 124 that comes into contact with a sample 122 mounted at a stage 120 by means of reflection mirrors 112 and 114 and the Cassegrainian mirror consisting of the concave face mirror 116 and convex face mirror 118.

The near-field light containing information on a sample scattered by a probe 126 is detected by light sampling means that consists of a convex face mirror 128, a concave face mirror 130, and a detector 132.

In the present embodiment, the detector 132 functions as computing means. Namely, a noise is measured; the detector temporarily stores the measurement value; a probe is deeply inserted into a field of near-field light, the noise measurement value is subtracted from light intensity to be measured; and data is delivered as the measurement result to a computer 134.

The computer 134 functions as analysis means; data delivered by the detector 132 is recorded in a hard disk, and spectrum analysis or the like can be carried out.

Further, the computer can control the entire apparatus, and is communicable in a bidirectional manner with FTIR 102, a probe control unit 136, and a stage control unit 138 as well as the detector 132.

With such a configuration, the near-field infrared microscope according to the present embodiment can analyze a measurement sample by using an infrared light.

What is characterized in the present embodiment is that, when measurement is started, a measurement start signal is delivered from a computer (control means, computing means) 134 to the stage control unit (control means) 138, and, when such a signal is received, a distance between the probe 126 and the sample 122 is automatically controlled by the stage control unit 138.

The above mechanism will be described in detail. The position of the probe 126 is detected by means of a position detector device 140, and the position information is delivered to the stage control unit 138. Based on the information, the stage control unit 138 drives a stage 120 in a vertical direction, and adjusts a distance between the probe 126 and the sample 122. In this manner, a loop 142 indicated by the arrow is formed, and the distance between the probe 126 and the sample 122 is automatically adjusted. What is characterized in the present embodiment is that an operating frequency of a movement mirror provided by an interferometer 144 in the FTIR is delivered as a scan signal to the stage control unit 138; the stage control unit 138 causes the distance between the stage 120 and the prove 126 to be proximal within a light wavelength at a forward passage of the movement mirror based on this scan signal, and spaces the above distance to be longer than or proximal to the light wavelength in distance at the backward passage of the movement mirror.

In this manner, in the detector 132, the light intensity when the sample or probe is deeply inserted into a field of near-field light can be detected at the forward passage of the movement mirror in synchronism with reciprocating motion of the movement mirror provided by the interferometer; and the light intensity when the probe is spaced from a field of near-field light or is disposed at a position that is shallow in a field of near-field light at the backward passage of the movement mirror. Therefore, the detector 132 also carries out measurement at a measurement cycle at which reciprocating motion of the movement mirror is defined as one set. This detector temporarily stores the noise obtained at the backward passage of the movement mirror, subtracts the stored noise from the light intensity obtained by the following forward passage, and transmits data to the computer 134.

In this way, the stage adjusts a position relevant to the probe in synchronism with reciprocating motion of the movement mirror, thus making it possible to automatically eliminate an effect of noise from the measurement value.

In addition, in the present embodiment, a switching reflection mirror 146 is located between a Cassegrainian mirror that consists of a convex face mirror 128 and a concave face mirror 130 and a detector 132, and the reflection mirror is inserted into an optical path indicated by dotted line, thereby making it possible to visually observe a sample and a probe from an eye contact lens 148.

In observing the sample and probe, it is preferable to use a visible light source (not shown) instead of an infrared light source using the FTIR and illuminate. With such a configuration, adjustment of an optical system such as Cassegrainian mirror or adjustment of mounting of a sample can be carried out simply.

When a dichroic mirror for reflecting visible light and transmitting infrared light is used instead of the switching reflection mirror 146, the dichroic mirror can always be located between the Cassegrainian mirror that consists of the convex face mirror 128 and the concave face mirror 180 and the detector 132, making it possible to simplify an optical system and its operation.

Where such measurement has been carried out by using a sample according to the present embodiment, an infrared near-field spectrum can be properly measured irrespective of using an infrared light source. In addition, the measurement time is remarkably reduced because of its synchronism with an operation of the movement mirror.

As has been described above, according to the near-field microscope of the present invention, an effect of noise can be eliminated from the measurement result.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

We claim:

1. A near-field microscope comprising:

a probe for scattering a near-field light;

light emitting means including a light source for emitting light to a sample or said probe; and light sampling means for sampling and detecting a light that includes information of the sample scattered by said probe, said microscope comprising:

control means for spacing said sample or probe from a field of a near-field light generated by said light emission or disposing the sample or probe at a position that is shallow in a field of near-field light, thereby detecting a noise by said light sampling means; inserting said sample or probe deeply into a field of near-field light generated by said light emission, thereby detecting light intensity by said light sampling means; and computing means for computing a measurement result obtained by subtracting a noise from said light intensity.

2. A near-field microscope as claimed in claim 1, comprising:

spectroscopic means for spectrographically dispersing light emitted to a sample or probe by the light emitting means or light containing information on a sample scattered by said probe into light whose wavelength is within a specific range; and analysis means for storing and analyzing measurement data for each wavelength sampled by the light sampling means, whereby a near-field spectrum on a sample can be sampled.

3. A near-field microscope as claimed in claim 2, wherein an interferometer is used for the spectroscopic means, said interferometer includes a movement mirror that carries out reciprocating motion, said control means controls so that the sample or probe is deeply inserted into a field of a near-field light in a forward passage of said movement mirror, light intensity is detected by the light sampling means, said sample or probe is spaced from a field of a near-field light in a backward passage of the movement mirror or is disposed at a position that is shallow in a field of near-field light, and a noise is detected by said light sampling means.

4. A near-field microscope as claimed in claim 1, wherein light emitted by light emitting means is infrared light.

5. A near-field microscope as claimed in claim 4, wherein a light source contained in light emitting means is a high temperature heating element.

6. A near-field microscope as claimed in claim 4, wherein a light source for emitting light to a sample or probe is a wavelength variable laser.

7. A near-field microscope as claimed in claim 2, wherein the spectroscopic means is composed of any of a wavelength variable filter, a band pass filter having an arbitrary wavelength width, a Fourier transform type spectroscopic device or a dispersion type spectroscopic device.

8. A near-field microscope as claimed in claim 1, wherein the light emitting means carries out illumination by means of reflecting illumination that emits light directly to a sample or the probe, thereby generating a near-field light and by means of total reflecting illumination that brings a prism of a medium with its high refraction index into contact with a sample and reflects the light totally at a boundary of the sample and prism, thereby generating a near-field light on a sample surface.

9. A near-field microscope as claimed in claim 8, wherein the light emitting means can be selected by switching it to illumination of either one of the reflecting illumination and the total reflecting illumination.

10. A near-field microscope as claimed in claim 8, wherein the light emitting means is composed of at least a light source and a Cassegrainian mirror.

11. A near-field microscope as claimed in claim 10, wherein the shape of a medium with its high refraction index for use in total reflecting illumination is a hemispheric or analogous shape, and a focus of the Cassegrainian mirror is formed at the center of said prism plane section.

12. A near-field microscope as claimed in claim 8, wherein a medium with its high refraction index of the total reflecting prism for use in total reflecting illumination is composed of any material of ZnSe, KSR-5, Ge, Si, and diamond.

13. A near-field microscope as claimed in claim 1, wherein the light sampling means is composed of: a Cassegrainian mirror for collecting light that contains sample information; and a detector for detecting the light collected by said Cassegrainian mirror.

14. A near-field microscope as claimed in claim 1, comprising modulating means for modulating light emitted to a sample or probe intermittently between a light source and the sample or probe.

15. A near-field microscope as claimed in claim 13, wherein a switching reflection mirror or dichroic mirror is arranged between the Cassegrainian mirror and the detector, and is arranged so as to enable the sample and probe to be visually observed.

16. A near-field microscope as claimed in claim 3, wherein the spectroscopic means is composed of any of a wavelength variable filter, a band pass filter having an arbitrary wavelength width, a Fourier transform type spectroscopic device or a dispersion type spectroscopic device.

17. A near-field microscope as claimed in claim 9, wherein the light emitting means is composed of at least a light source and a Cassegrainian mirror.

18. A near-field microscope as claimed in claim 1, wherein the light emitting means carries out illumination by means of reflecting illumination that emits light directly to a sample or the probe, thereby generating a near-field light or by means of total reflecting illumination that brings a prism of a medium with its high refraction index into contact with a sample and reflects the light totally at a boundary of the sample and prism, thereby generating a near-field light on a sample surface.

19. A near-field microscope as claimed in claim 18, wherein the light emitting means can be selected by switching it to illumination of either one of the reflecting illumination and the total reflecting illumination.

20. A near-field microscope as claimed in claim 18, wherein the light emitting means is composed of at least a light source and a Cassegrainian mirror.

21. A near-field microscope as claimed in claim 18, wherein the shape of a medium with its high refraction index for use in total reflecting illumination is a hemispheric or analogous shape, and a focus of the Cassegrainian mirror is formed at the center of said prism plane section.

22. A near-field microscope as claimed in claim 18, wherein a medium with its high refraction index of the total reflecting prism for use in total reflecting illumination is composed of any material of ZnSe, KSR-5, Ge, Si, and diamond.

23. A near-field microscope as claimed in claim 19, wherein the light emitting means is composed of at least a light source and a Cassegrainian mirror.

24. A near-field microscope as claimed in claim 1, wherein the control means spaces the sample or probe from the field of the near-field light generated by the light emission or disposes the sample or probe at the position that is shallow in the field of near-field light in a state that the sample is placed, thereby the noise is detected by the light sampling means; inserts the sample or probe deeply into the field of near-field light generated by the light emission in the state that the sample is placed, thereby the light intensity is detected by the light sampling means, the computing means computes the measurement result obtained by subtracting the noise which is obtained by the light sampling means in the state that the sample is placed and the sample or probe is spaced from the field of the near-field light or disposed at the position that is shallow in the field or near-field light, from the light intensity which is obtained by the light sampling means in the state that the sample is placed and the sample or probe is deeply inserted into the field of the near-field light.

* * * * *